(12) United States Patent
Andarawis et al.

(10) Patent No.: US 8,272,246 B2
(45) Date of Patent: Sep. 25, 2012

(54) ELECTRONIC SELF-CALIBRATION FOR SENSOR CLEARANCE

(75) Inventors: Emad Andarawis Andarawis, Ballston Lake, NY (US); Wayne Charles Hasz, Pownal, VT (US); David So Keung Chan, Niskayuna, NY (US); David Mulford Shaddock, Troy, NY (US); John Harry Down, Lanesborough, MA (US); Samhita Dasgupta, Niskayuna, NY (US); David Richard Esler, Gloversville, NY (US); Zhiyuan Ren, Malta, NY (US); Mahadevan Balasubramaniam, Ballston Lake, NY (US); Ibrahim Issoufou Kouada, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 915 days.

(21) Appl. No.: 12/241,499

(22) Filed: Sep. 30, 2008

(65) Prior Publication Data

US 2010/0077830 A1    Apr. 1, 2010

(51) Int. Cl.
*G01B 21/00* (2006.01)
(52) U.S. Cl. ........................................................ 73/1.79
(58) Field of Classification Search ............ 73/1.79; 324/601, 662, 635
See application file for complete search history.

(56) References Cited

U.S. PATENT DOCUMENTS

| | | | | |
|---|---|---|---|---|
| 4,654,636 A * | 3/1987 | Rusk | ............................... | 341/13 |
| 6,252,393 B1 | 6/2001 | Hedengren | .................... | 324/202 |
| 7,180,305 B2 | 2/2007 | Andarawis et al. | ........... | 324/667 |
| 7,215,129 B1 | 5/2007 | Andarawis et al. | ........... | 324/662 |
| 7,332,915 B2 | 2/2008 | Andarawis et al. | ........... | 324/662 |
| 7,333,913 B2 | 2/2008 | Andarawis et al. | ........... | 702/158 |
| 2006/0132147 A1 | 6/2006 | Balasubramaniam et al. | ............................. | 324/662 |
| 2006/0239813 A1 | 10/2006 | Shah et al. | ..................... | 415/119 |
| 2007/0128016 A1 | 6/2007 | Dasgupta et al. | ............... | 415/14 |
| 2007/0222459 A1 | 9/2007 | Andarawis et al. | ........... | 324/644 |
| 2008/0072681 A1 | 3/2008 | Ruud et al. | ....................... | 73/735 |

FOREIGN PATENT DOCUMENTS

FR    2624324 A1    6/1989

OTHER PUBLICATIONS

European Search Report dated Mar. 2, 2010.
Donald L. Simon, Sanjay Gang, Gary W. Hunter, and Ten-Huei Guo, Kenneth J. Semega; "Sensor Needs for Control and Health Management of Intelligent Aircraft Engines"; NASA/TM-2004-213202;ARL-TR-3251, GT2004-54324; Prepared for theTurbo Expo 2004 sponsored by the American Society of Mechanical Engineers,Vienna, Austria, Aug. 2004; Downloaded from Internet:<http://gltrs.grc.nasa.gov/reports/2004/TM-2004-213202.pdf>; 17 Pages.

* cited by examiner

*Primary Examiner* — Peter Macchiarolo
*Assistant Examiner* — Tamiko Bellamy
(74) *Attorney, Agent, or Firm* — Scott J. Asmus

(57) ABSTRACT

Self-calibration of a multiple channel clearance sensor system, which in one embodiment includes at least one sensor for measuring at least one clearance parameter signal between a stationary object and a rotating object of a rotating machine. The sensor output is processed as a clearance parameter by an offset correction section configured to determine an offset error in the clearance parameter signal which is used by a level shifter. The level shifter is also switchably coupled to the clearance parameter signal wherein the output of the level shifter, which may be amplified and digitally converted, is processed by a signal level analyzer to determine a channel gain signal.

24 Claims, 8 Drawing Sheets

ELECTRONIC SELF-CALIBRATION FOR SENSOR CLEARANCE

BACKGROUND

The present description relates generally to methods and systems for calibration of a sensor system, and more particularly to calibration of differential sensing systems.

Various types of sensor systems have been used to measure the distance between two objects. One of such sensor systems includes a two-channel differential sensing system. In a two channel differential sensing system, various error sources that affect the two channels uniformly can be eliminated or reduced. Matching a response of the two channels is of utmost importance to be able to realize the benefits of the differential measurement. Any mismatch in the response of the two channels results in significant error in a measurement. For example, the error in clearance measurement results in inaccurate displacement between a shroud and a turbine blade of a turbine. It is therefore desired to dynamically and periodically check and correct the matching of the response of the two channels in the system. Variation in electronic components due to temperature effects and long term drifts are two reasons for change in response of the channel.

Various techniques in circuit design have been utilized to reduce the temperature coefficient of circuits and to reduce the effect of the drifts. However, these techniques don't ensure measurement accuracy over a long period of time. A commonly used technique is use of temperature compensated components in the sensor system. Another commonly used technique is use of very low drift components. Both of these methods reduce the variation, but make no provision for detecting and correcting drifts and variations over time and temperature. Current clearance sensing systems rely heavily on frequent lab calibration to address this problem. For example, for a flight system that requires many years of service without human intervention, calibration must be done in a transparent way and must not require the system be taken apart, or any human intervention.

BRIEF DESCRIPTION

In accordance with one exemplary embodiment of the present invention, a system for self-calibration of multiple channel clearance sensor system is provided. The system includes a sensor for measuring a clearance parameter between a stationary object and a rotating object. The system also includes an offset correction section to determine an offset error in the clearance parameter and a level shifter to shift the clearance parameter by the offset error. An amplifier is provided to amplify the level shifter output and an analog to digital converter is coupled to the amplifier output to provide a digital output. The system further includes a signal level analyzer to determine a channel gain signal based on a discrepancy voltage. The level shifter in the system is switchably coupled to the clearance parameter signal and a reference signal to process the discrepancy voltage.

In accordance with another exemplary embodiment of the present invention, a system for self-calibration of a clearance sensor system is provided. As in the earlier embodiment, the system includes a sensor, an offset correction section, a level shifter, an amplifier and a signal level analyzer. However, in this embodiment the clearance parameter signal and a reference signal to process the discrepancy voltage are coupled together to the level shifter.

In accordance with one embodiment of the present invention, a method for calibrating a multiple channel sensor system is provided. The method includes measuring a clearance parameter between a stationary object and a rotating object, measuring an offset error in the clearance parameter and shifting the clearance parameter to compensate for the offset error. The method further includes measuring a discrepancy in the clearance parameter and controlling gain values of the channel based on the measured discrepancy.

In accordance with yet another embodiment of the present invention a system for self-calibration of a sensor system is provided. The system includes a sensor and a calibration section coupled to the sensor. The calibration section consists of a level shifter, a gain stage and a signal level analyzer for processing calibration curves. The calibration section further includes a reference section providing a common mode reference.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail herein, embodiments of the invention include a system and method for self-calibration of clearance measurement.

Figure 1:
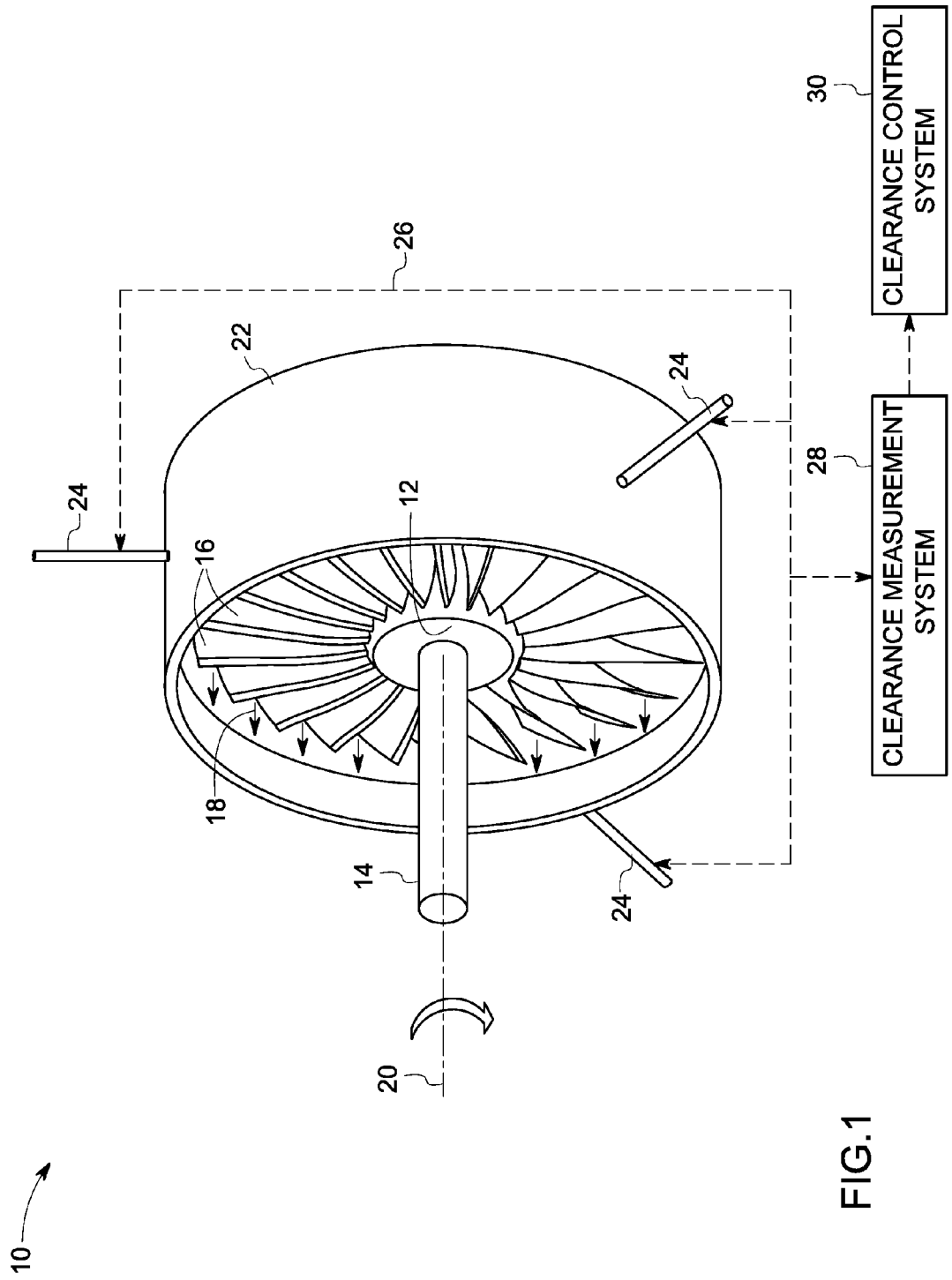
FIG. 1 is a diagrammatical representation of a rotating machine having a sensor system, in accordance with an embodiment of the present invention.

FIG. 1 is a perspective view of an exemplary rotating machine, such as an aircraft engine turbine 10, wherein aspects of the present technique can be incorporated. It should be noted here, however, that the present technique can be used in any other rotating machine such as but not limited to steam turbine and gas turbine. The turbine includes a rotor 12 mounted on a shaft 14. A plurality of turbine blades 16, are affixed to the rotor 12. In operation, the blades 16 are subject to a fluid 18 or steam at a high temperature and pressure, which does work on the blades 16 and causes them to rotate about an axis 20. The blades 16 rotate within a stationary housing or shroud 22 that is positioned approximately radially and circumferentially around the blades. There is a relatively small clearance between the blades 16 and the shroud 22 to prevent excessive leakage of the working fluid between the blades 16 and the shroud 22. In the ideal no loss system, there should be no clearance, so all the fluid will work on blades 16 only. However, that configuration will make movement of blades impossible due to the resistance between the blades 16 and the shroud 22 or to prevent rubs between the rotor blades 16 and the shroud 22. A zero clearance system is also impractical because of vibrations.

In accordance with one embodiment, one or more clearance sensors 24 are disposed within and circumferentially around the stationary shroud 22. In the illustrated embodiment, the clearance sensors 24 include capacitive probes. Capacitive probe sensors provide variable capacitance as a representative of the clearance. In certain embodiments, the clearance sensors 24 may include microwave based sensors, optical sensors, or eddy current sensors. As will be appreciated by those skilled in the art, microwave sensors or optical sensors emit a radio signal or a light signal respectively on the target and measure characteristics of the reflection that is based on the clearance. These characteristics may include the amplitude of the reflected signal, a time delay or phase difference between an excitation and a reflected signal. Similarly, eddy current sensors induce eddy currents in the target. The interaction of the magnetic fields produced by eddy currents and the sensor currents depends on clearance. The eddy current sensor then provides a voltage output representative of the clearance. The target in one embodiment is a turbine blade.

One advantage of using capacitive sensors is it provides sub mills resolution. Each of the sensors 24 is configured to generate a signal indicative of a radial and/or an axial position of the blades 16 with respect to the shroud 22 at their respective circumferential locations. The sensor signals 26 are transmitted to a clearance measurement system 28 for measuring the clearance. Further, the clearance measurement through the clearance measurement system 28 is used for controlling the clearance between the shroud 22 and the turbine blades 16 via a clearance control system 30. The sensor signals 26 can be communicated to the clearance measurement system 28 via a signal wire or wirelessly via a wireless transmitter or transceiver (not shown). The communication can be unidirectional from the sensors to the clearance measurement system or bidirectional between the sensors and the measurement system.

Figure 2:
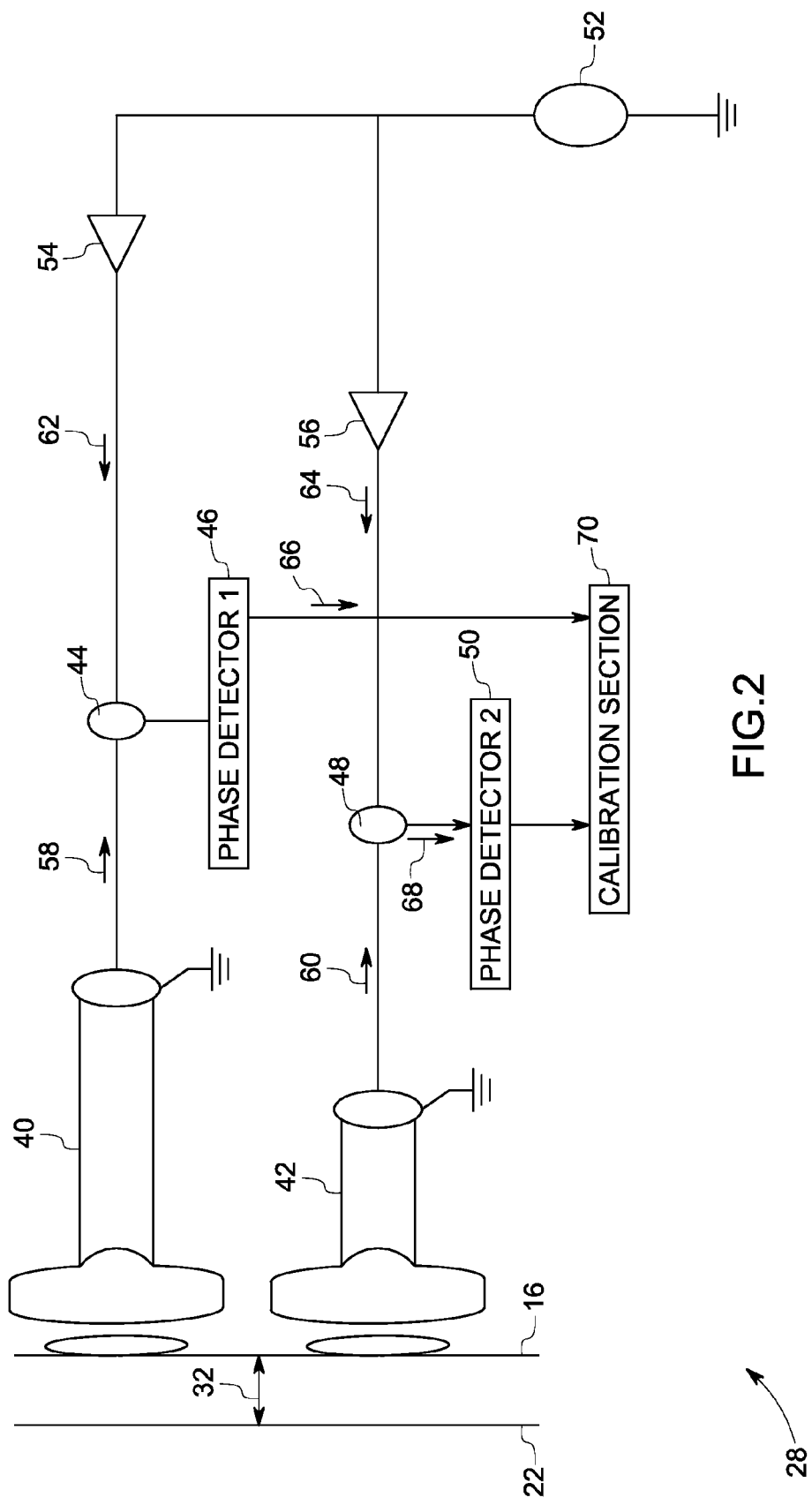
FIG. 2 is a diagrammatical representation of a sensor system of FIG. 1, in accordance with an embodiment of the present invention.

FIG. 2 illustrates an exemplary configuration of a clearance measurement system 28 of FIG. 1. The system 28 in this embodiment comprises first and second sensors 40, 42 configured to generate first and second measurement signals representative of first and second capacitance between the shroud 22 and the rotor blades 16 of steam turbine of FIG. 1.

In this example, the clearance 32 between the shroud and the rotor blades of the turbine is calculated by ratiometric techniques from first and second signal of first and second sensor 40, 42. A bidirectional coupler 44 and a phase detector 46 are coupled to the first sensor 40 for measuring the capacitance through the first sensor 40. Similarly, a bidirectional coupler 48 and a phase detector 50 are coupled to the second sensor 42 for measuring the capacitance through the second sensor 42. A signal generator 52 is coupled to the first and second sensors 40 and 42 for exciting the first and second sensors. Further, first and second amplifiers 54, 56 are coupled to the signal generator 52 to amplify input signals generated from the signal generator 52. The amplifiers 54, 56 are optional depending upon the signal generation capability and filtering can also be used to condition the signal generator output. In one embodiment, a capacitor (not shown) can be deployed in series with each sensors 40, 42 and signal generator 52 and the phase detectors 46, 52 can be coupled on either side of the capacitor.

According to one embodiment, the signal generator 52 at an excitation frequency excites first and second sensors 40, 42 via the first and second excitation signals 62, 64. A first and second reflected signal 58, 60 corresponding to the first and second excited signal 62, 64 will originate from the first and second sensors 40, 42. The capacitance through the first sensor 40 is measured by measuring a phase difference between the excitation signal 62 and the corresponding reflected signal 58 by the bidirectional coupler 44 and the phase detector 46. The phase detector 46 is configured to detect a first reflected signal 58 based upon the excitation frequency to generate first measurement signal 66. Similarly, measuring a phase difference between the excitation signal 64 and the corresponding reflected signal 60 by the bidirectional coupler 48 and the phase detector 50 generates the second measurement signal 68 representative of the capacitance through the second sensor 42. The first and second measurement signals 66 and 68 are then transmitted to a calibration section 70 for calculation of the clearance based upon a function of the first and second measurement signals 66 and 68. In one embodiment the function is a ratio between first and second measurement signals. As described herein, the sensor system 28 in this example employs two sensors 40, 42 for capacitive measurements between the rotor blades 22 and the shroud 16. However, other configurations of the sensor system having more sensors are within the scope of the system.

The capacitance between two objects that are approximately in a parallel plate configuration is given by following equation:

$$C = \varepsilon_r \varepsilon_0 \frac{A}{d}; \quad (1)$$

where, C is the capacitance, A is the overlap surface area of the object, d is the distance between the two objects, $\epsilon_0$ is permittivity of free space and $\epsilon_r$ is the permittivity of a medium between the two objects. From equation (1), it can be seen that the capacitance between two objects depends on the distance between two objects. Thus, by calculating the capacitance between the shroud and the rotor blades, the distance between the shroud and the rotor blades is thereby calculated.

In one embodiment, the processing circuitry 70 includes a filter (not shown) and a combiner (not shown). The output signals 66, 68 from the phase detectors 46, 50 may include a noise component due to crosstalk between the first sensor 40 and the second sensor 42. Thus, a filter can be used to filter signal noise generated by the crosstalk between the sensors. The combiner combines the output signals from the phase detectors to determine a ratiometric capacitance between the shroud and the rotor blades. The ratiometric capacitance provides a substantially accurate error-minimized capacitance measurement between the shroud and the rotor blades.

Figure 3:
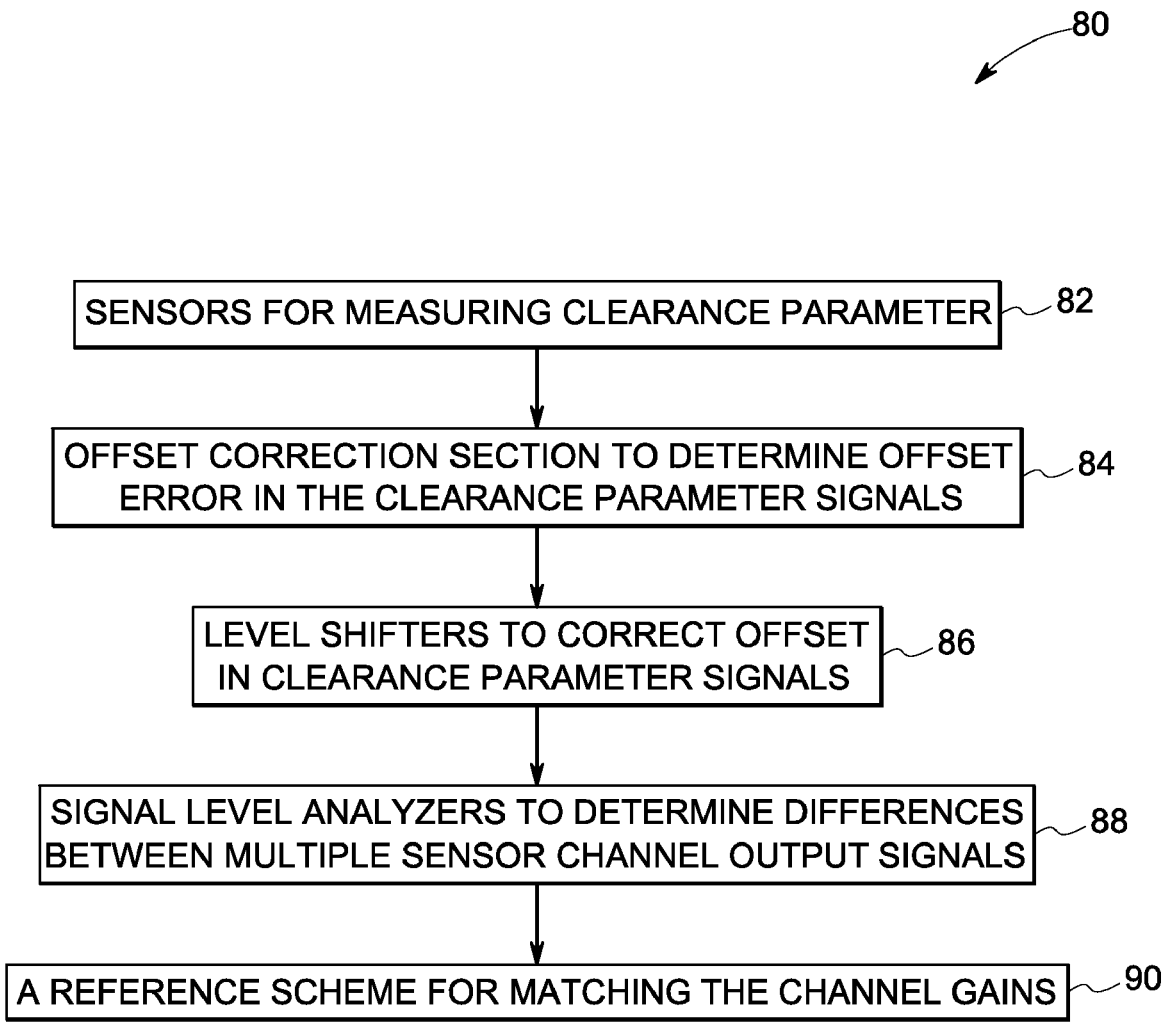
FIG. 3 is a diagrammatical representation of an exemplary system for clearance measurement in accordance with an embodiment of the present invention.

FIG. 3 is a diagrammatical illustration of an exemplary system 80 for clearance measurement for a rotating machine. In the illustrated embodiment, sensors 82 measure and generate signals representing clearance parameter. As explained earlier the sensors may be capacitive probe sensors, microwave based sensors, optical sensors, or eddy current sensors. In one embodiment and offset correction section is used to determine the offset error in the clearance parameter signals 84. In one example, a DC level finder determines offset error in the clearance measurement signal and level shifters 86 are used in the system to correct the offset errors in the clearance measurement signals. The system further comprises signal level analyzers 88 to determine the difference between the channel sensor outputs. In one embodiment, a reference scheme 90 is used for matching the channel gains. The reference scheme 90 may include an automatic gain controller and it can be an absolute scheme or a relative scheme. It should be noted that the offset correction section and the signal level analyzer can be implemented in an analog domain or by appropriate programming of a digital processor, or a combination of analog and digital circuitry such as a amplifiers, microprocessors, analog-to-digital converters and digital-to-analog converters. One embodiment is a two channel sensor system however multiple channel processing is also within the scope of the invention. In one multiple channel embodiment, the channels can be referenced to each other while in another embodiment one of the channels is selected as a reference channel. For example, certain applications such as radial and axial clearance, that uses multiple sensors in the processing.

Figure 4A:
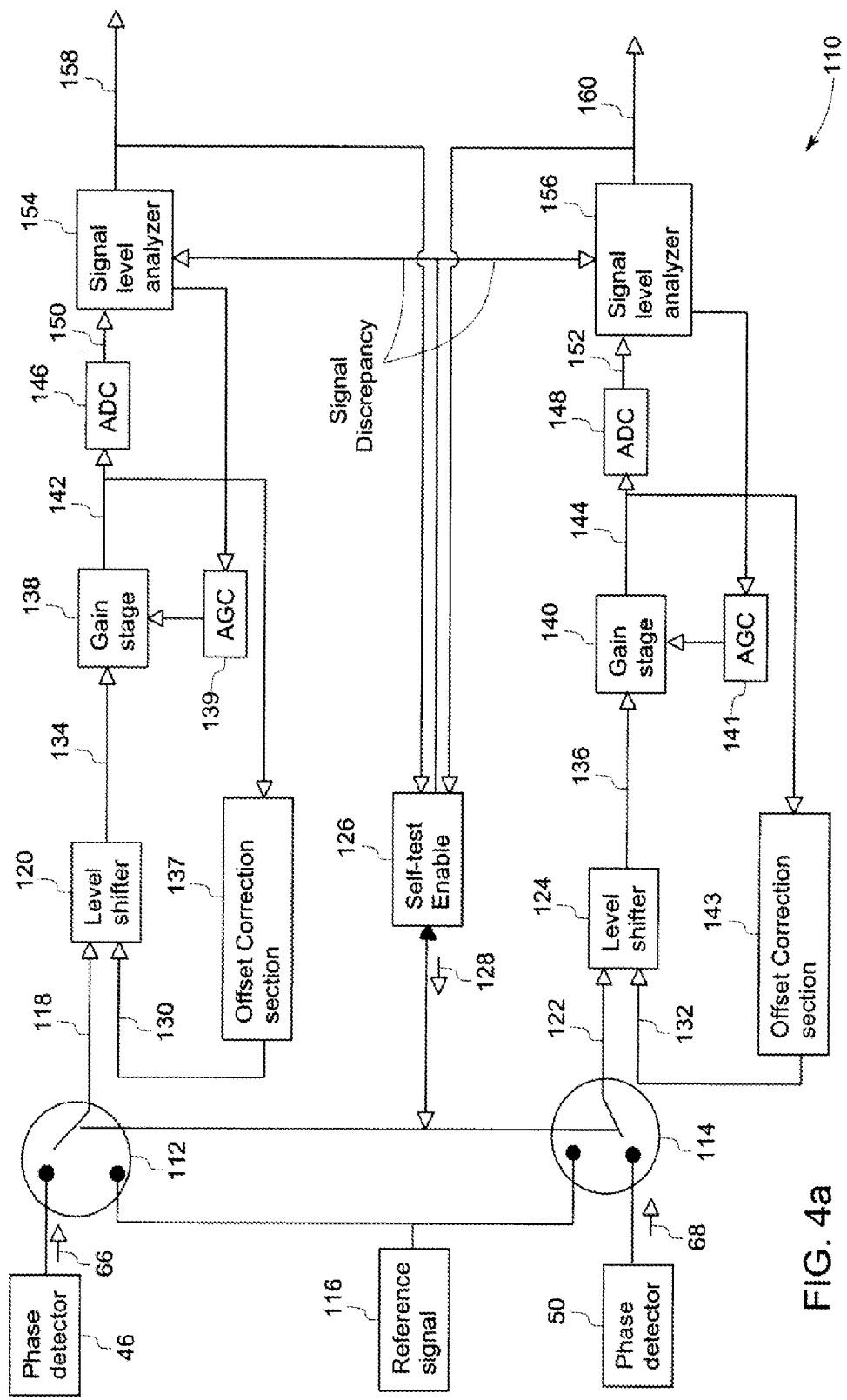
FIG. 4a is a schematic illustration of an exemplary absolute calibration section, in accordance with an embodiment of the present invention.

FIG. 4*a* is one representation 110 of an exemplary calibration circuitry in FIG. 2. This figure shows signal conditioning gain with absolute gain correlation for a two-channel system. As explained herein, in a two channel differential sensing system, tight matching of the response of the two channels results in higher performance. The reference to channel herein refers to the sensor(s) and its corresponding elements that are used to determine clearance such as shown in FIG. 1. Any mismatch in the response of the two channels will reduce the common-mode error rejection ability of the system. The calibration section ensures the errors between first and second clearance measurement signals 66 and 68 are common-mode and ensures that any error signals that are common to both channels continue to have an identical effect on the output of both channels after passing through the signal conditioning. In the illustrated example, first switch 112 and second switch 114 are coupled to the first phase detector 46 and the second phase detector 50 respectively. The first and second clearance measurement signals 66, 68 from the first and second phase detector 46, 50 are the first inputs to the first and second switches 112 and 114. In this example the first and second switches 112, 114 are single pole double through (SPDT) switches. As will be appreciated by those skilled in the art SPDT switch can have two positions thereby allowing the processing section to connect to either the phase detector signals 66, 68 or a reference signal 116. In another embodiment, the switches 112, 114 are radio frequency controlled switches that operate via multiple radio frequency signals in a desired range. In another embodiment the switch may be a MEMS switch. Other switching mechanisms can be employed which are known to those in the art.

A common reference signal 116 is a switched input to the first and the second switches. Applying the common reference signal 116 to the calibration section 110 via the first and the second switch 112, 114 allows for establishing a common reference point that ensures that differential error between the channels is minimized. An output signal 118 of the first switch 112 is an input to a first level shifter 120. Similarly, an output signal 122 of the second switch 114 is an input to a second level shifter 124. A self-test enable 126 generates an enable signal 128 for the first and second switches 112, 114 to control the switching for the reference signal 116. In one embodiment, if the enable signal 128 is 'high', the reference signal 116 is the first input 118, 122 to the level shifters 120, 124. If the enable signal is 'low', the output signal of phase detector 46, 50 is the first input 118, 122 to the level shifters 120, 124 respectively. In one embodiment, the self-test enable circuit 126 generates the enable signal 128 at a pre-determined switching interval or in response to a calibration request signal.

The level shifters 120, 124 shift the input signals 118, 122 by a level provided by the shift level input signals 130, 132. The shift level input signals 130 and 132 are provided by offset correction circuitry 137 and 143 respectively. The output signals 134, 136 of the level shifters 120, 124 are then transmitted to the gain stages 138, 140 or the amplifiers. The amplifiers 138, 140 amplify the output signals 134, 136 from the level shifters 120, 124. There may be automatic gain controller (AGC) 139, 141 coupled to each corresponding gain stage 138, 140 to maintain a referenced amplification.

In one embodiment, the reference signal source 116 used is a temperature compensated very low drift components source. Thus, a high accuracy reference signals ensures that the gain of the amplifier is also well controlled. The output signals from the amplifier 142 and 144 are then input to analog-to-digital converters 146, 148 that converts signals 142, 144 to digital calibrated signals 150, 152. The analog-to-digital converter 146, 148 outputs the calibrated voltages into signal level analyzers 154, 156. Voltage signal outputs or channel gain signals 158, 160 from the signal level analyzers 154, 156 are used to generate calibration curves for processing that can be done in real-time or for post processing. The channel gain signals 158, 160 from the signal level analyzers 154, 156 are also coupled to the self-test enable 126. The self-test enable 126 then controls the switching of the signals between the reference signal 116 and the phase detector output signals 66, 68. When the reference signal 116 is the input to the level shifters 120, 124, discrepancy in the voltage signals 158 and 160 obtained from first and second signal level analyzers 154 and 156 respectively is measured. Accordingly, the gain one or both of the gain stages 138, 141 is then adjusted to match the respective discrepancy in the voltage signals 158 and 160. In one embodiment, the adjustment takes place in the analog domain through the use of controllable components such as variable gain amplifiers. In another embodiment, the discrepancy signal is digitized and a digital gain correction is calculated. The gain correction signal is used to correct the gain of the two channels in the digital domain.

It should be understood that while the explanation is directed to a two channel system, the system is not restricted to two channels and other embodiments have multiple channel processing capabilities. For example, a three-channel embodiment would have three sensors and accompanying processing elements as detailed herein with the reference signal switched between the three channels. In one further embodiment, certain elements can be shared and the various sensors can be switched as appropriate.

In one embodiment of the present invention, the DC level component in the phase detector signal and gain values of amplifiers are detected and tracked periodically by using on board references and algorithms to track these values. The information is then sent to a processing unit. The processing unit calculates correction factors for each channel and also tracks the history of corrections. The processor applies the corrections to the data i.e. corrections to the gain of the amplifiers or corrections to the shift level signal of the level shifter. The corrections are done to have high degree of matching between the characteristics of the two channels. If after the corrections, a trend is detected by the processor that the gain or offset is drifting at a high rate, health assessments of the sensor, and electronics are made. Based on the assessment, the processor may trigger an alert indicating that a higher than expected error or deterioration is detected and a service request for the clearance sensor system is dispatched. In a particular embodiment, the gain is adjusted via a digital multiplier.

Figure 4B:
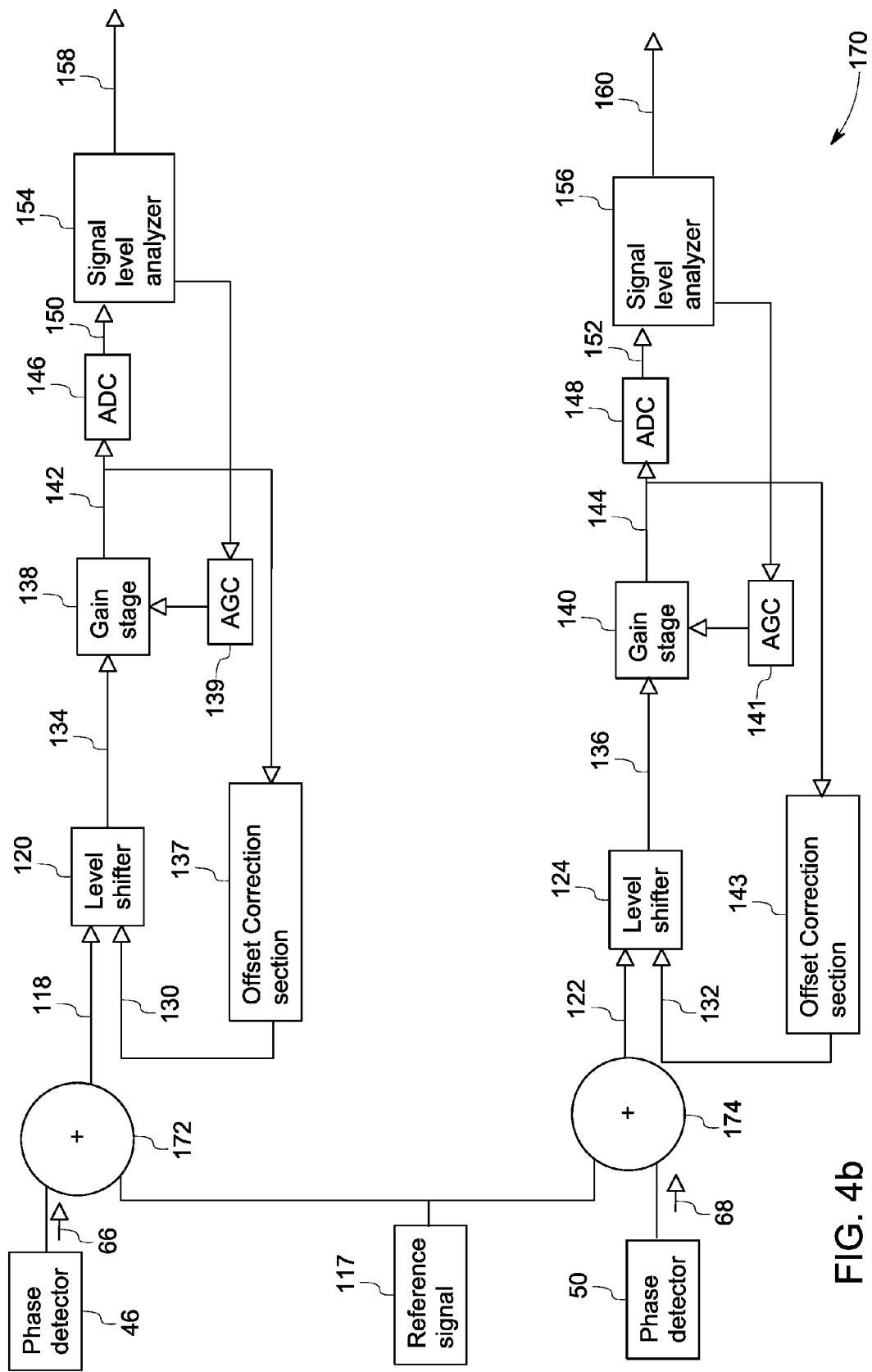
FIG. 4b is a schematic illustration of another exemplary absolute calibration section, in accordance with an embodiment of the present invention.

FIG. 4b is another representation of an exemplary calibration circuitry 170 of FIG. 2. In this embodiment, the phase detector output signals 66, 68 and the reference signal 117 are both inputs to the level shifters 120, 124. In other words, the first and second switches 112 and 114 and the self-test enable circuit 126 of earlier embodiment are omitted in this embodiment. A summer 172 is used to combine the phase detector output signal 66 and the reference signal 117 as appropriate to provide correlation. Similarly, a summer 174 adds the phase detector output signal 68 and the reference signal 117. In this embodiment, a frequency of the reference signal 117 and a frequency of the output signals 66, 68 of the phase detectors 46, 50 are different and offset adequately so there is no effect by having the reference signal 117 combined with the phase detector output signals 66, 68. In one embodiment, the frequency of the reference signal 117 is about 500 kHz and the frequency of the output signals 66, 68 of the phase detectors 46, 50 are about 100 kHz. It should be noted, however, that other values of frequencies can be used for these signals. This configuration enables simultaneous connection of the phase detector signal and the reference signal, and therefore ensures continuous input of the phase detectors 46, 50 outputs to the level shifters 120, 124. The reference signal processing can be performed at various time intervals or as otherwise established by design criteria.

Figure 5:
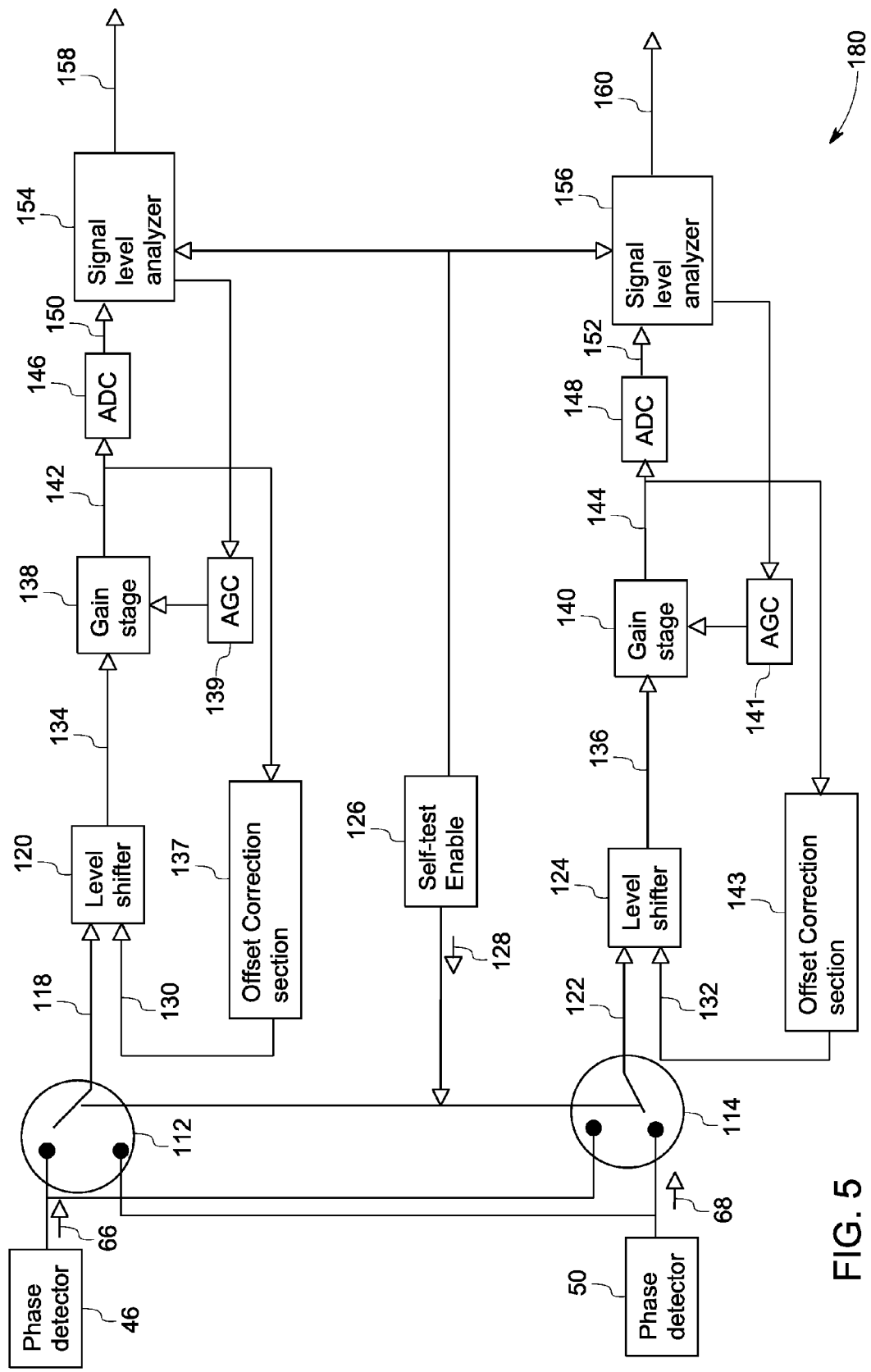
FIG. 5 is a schematic illustration of an exemplary relative calibration section, in accordance with another embodiment of the present invention.

FIG. 5 illustrates another exemplary configuration 180 of the calibration circuitry in FIG. 2. This example shows the signal conditioning gain with relative gain correlation between channels such that there is a relative reference signal processing. In this embodiment, output 66 of the first phase detector 46 is an input to second switch 114. Similarly, output 68 of the second phase detector 50 is an input to the first switch 112. In one embodiment, when the self-test enable signal 128 is switched, input signal 118, 122 to the first and second level shifters 120, 124 is the output signal 66 of first phase detector 46. In another embodiment, when the self-test enable signal 128 is switched, input signal 118, 122 to the first and second level shifters 120, 124 is the output signal 68 of second phase detector 50. This configuration avoids use of separate reference signal 116, 117 of FIG. 4a or FIG. 4b for the purpose of calibration. As noted herein, while described in a two channel implementation, multiple channels are a further embodiment and the reference processing can be implemented among the channels.

Figure 6:
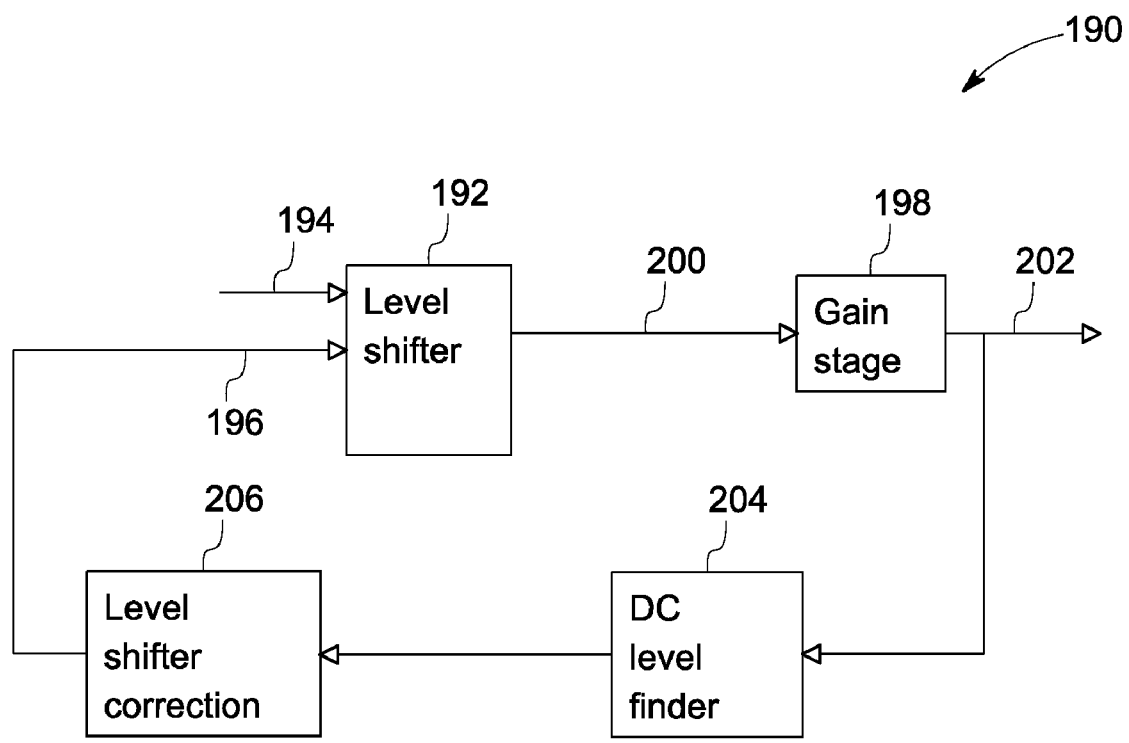
FIG. 6 is a schematic illustration of an offset calibration section in accordance with an embodiment of the present invention.

FIG. 6 is a schematic representation 190 of an offset correction circuitry of FIG. 4a, FIG. 4b, and FIG. 5 wherein the elements for only one channel are depicted. Similar functionality would be used for the other channel and there could be a common reference link such as coupling the inputs to the DC level finder 204. The reference signal is used to calculate an error signal between the actual DC level of the signal and the desired DC level. Using a common reference link in the DC level finder ensures that errors in the reference contribute equally to both channels, and therefore maintains a high degree of matching between the two channels. According to one embodiment this performs electronic offset processing and comprises a level shifter 192 configured to shift the level of a first input signal 194 based on a second input signal 196 of the level shifter 192. In one embodiment, the first input signal 194 is the first measurement signal 66 (FIG. 2) from first sensor 40 of FIG. 2. In another embodiment, the second input signal 196 of the level shifter 192 is a shift level signal or an offset signal. The offset correction circuitry 190 further comprises a gain stage 198 or an amplifier to amplify the output signal 200 of the level shifter 192. The gain stage output 202 is then used as measurement signal for calculation of clearance. The gain stage output signal 202 is also fed back to a DC level finder 204. The DC level finder 204 determines the DC component in the gain stage output signal. The error signal output of the DC level finder 204 is transmitted to a level shifter correction circuitry 206. The level shifter correction circuitry 206 then determines the offset by which the first input signal 194 of the level shifter 192 need to be shifted. Dynamic adjustment of the level shifter 192 ensures that large offsets do not saturate the amplifier stage 198. In one embodiment, similar offset correction circuitry is used for the second channel of FIG. 4a, FIG. 4b, and FIG. 5. The offset correction circuitry 190 is shown in a structural presentation however certain functionality may be implemented via software processing.

Figure 7:
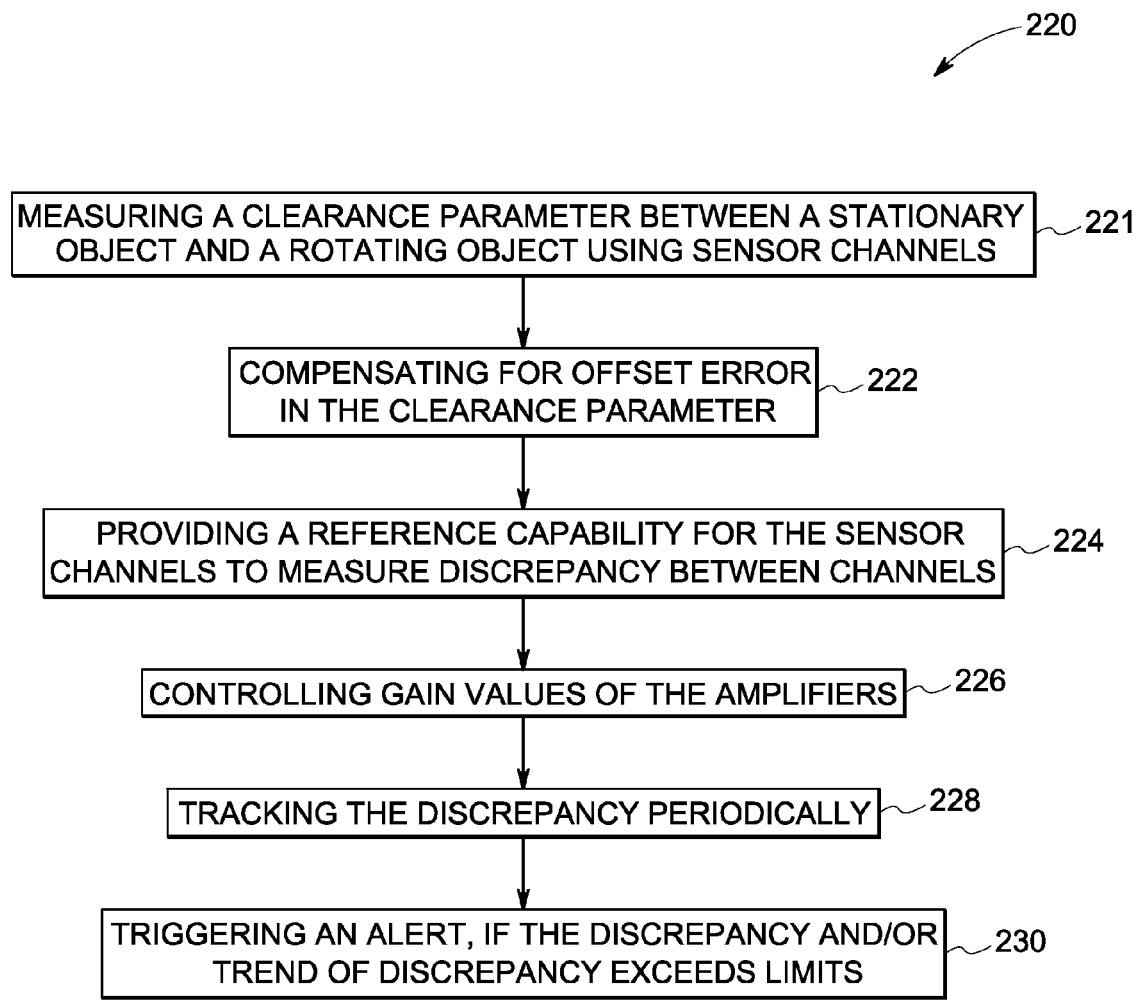
FIG. 7 is a flowchart illustrating steps of calibration of the sensor system.

FIG. 7 is a flowchart 220 illustrating steps of calibration of the multiple channel sensor system according to one embodiment. In step 221, the clearance parameter between the stationary object and the rotating object is measured using sensor channels. In step 222, an offset error in the clearance parameter is measured using an offset correction circuitry. In step 224, both the sensor channels are provided with a reference signal, whether a common reference signal such as shown in FIG. 4a, FIG. 4b or via the relative processing of FIG. 5. As described earlier, the common reference signal source will have temperature compensated very low drift components to control the gain properly. In one embodiment, in step 224, the output responses of the channels are measured and compared against each other. In other words, discrepancy between the channel output signals is measured. In step 226, the gain values of the amplifiers in the channels are controlled based on the measured discrepancy between two output signals and in step 228, the discrepancy or the error is tracked periodically. In one embodiment, a threshold value of the error is set in the memory of a processor. If the error is larger than the threshold value or larger than an expected error trend, then the processor triggers an alert indicating a maintenance request for the clearance sensor system in step 230. As explained herein, in one of the absolute calibration examples, a self-test enable circuit controls the input to the channels between the reference signal and the actual sensor output signal. The alert provides a mechanism to determine the health of the system and there are various alerting mechanisms such as audio, visual or both as well as notification schemes that can dispatch emails, text messages, or dial phone numbers.

As will be appreciated by those of ordinary skill in the art, the foregoing method or part of the method and the process steps may be implemented by suitable computer program code on a processor-based system, such as a general-purpose or special-purpose computer. The computer program code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for self-calibration of multiple channel clearance sensor system comprising:
   at least one sensor for measuring at least one clearance parameter signal between a stationary object and a rotating object;
   at least one offset correction section configured to determine an offset error in the clearance parameter signal;
   at least one level shifter coupled to said offset error and switchably coupled to said clearance parameter signal;
   at least one amplifier to amplify the level shifter output;
   at least one analog to digital converter (ADC) coupled to the amplifier output to provide a digital output;
   at least one signal level analyzer coupled to the digital output and configured to determine at least one channel gain signal based on a discrepancy voltage; and
   a reference signal switchably coupled to said level shifter providing a reference signal used to process the discrepancy voltage.

2. The system of claim 1, wherein said discrepancy voltage is used by said level shifter through said offset correction section.

3. The system of claim 1, wherein said reference signal is intermittently switchably coupled to the level shifter.

4. The system of claim 1, further comprising an automatic gain controller coupled to the signal level analyzer and configured to control a gain of the amplifier.

5. The system of claim 1, wherein the stationary object comprises a shroud of a rotating machine.

6. The system of claim 1, wherein the rotating object comprises a rotating blade of a rotating machine.

7. The system of claim 1, wherein the sensor comprises a capacitor sensor, a microwave based sensor, an optical based sensor or an eddy current sensor.

8. The system of claim 1, wherein the level shifter and the offset correction section are implemented in an analog domain.

9. The system of claim 1, wherein the offset correction section and the signal level analyzer are implemented by appropriate programming of a digital processor.

10. The system of claim 1, wherein the clearance parameter comprises a capacitance between the stationary object and the rotating object.

11. A system for self-calibration of a clearance sensor system comprising:
    at least one sensor for measuring at least one clearance parameter signal between a stationary object and a rotating object;
    at least one offset correction section configured to determine an offset error in the clearance parameter signal;
    at least one level shifter coupled to a reference signal, said clearance parameter signal and said offset error, and configured to combine the clearance parameter signal and the reference signal used to process a discrepancy voltage;
    at least one amplifier to amplify the level shifter output; and
    at least one signal level analyzer coupled to the level shifter output and configured to determine at least one channel gain signal based on the discrepancy voltage.

12. The system of claim 11, wherein the offset correction section, the signal level analyzer are implemented in an analog domain, by appropriate programming of a digital processor or a combination of both.

13. A method for calibrating a multiple channel sensor system comprising:
    measuring a clearance parameter between a stationary object and a rotating object using a sensor;
    measuring an offset error in the clearance parameter;
    shifting the clearance parameter to compensate for the offset error;
    measuring a discrepancy in the clearance parameter; and
    controlling gain values of the channel based on the discrepancy.

14. The method of claim 13, wherein measuring the clearance parameter comprises processing a capacitance between the stationary object and the rotating object.

15. The method of claim 14, wherein the capacitance between the stationary object and the rotating object is measured by a ratiometric technique.

16. The method of claim 13, wherein measuring the discrepancy comprises providing a common mode reference signal to the channels.

17. The method of claim 16, further comprising switching between the common mode reference signal and the clearance parameter.

18. The method of claim 17, wherein the switching is controlled by a self-test enable circuit.

19. The method of claim 16, wherein the commone mode reference signal is provided by a temperature compensated low drift components source.

20. The method of claim 16, wherein the common mode reference signal is a phase detector output signal.

21. The method of claim 13 further comprising tracking the discrepancy periodically.

22. The method of claim 13 further comprising triggering a maintenance request alert for a discrepancy threshold or a discrepancy trend.

23. A system for self-calibration of a sensor system comprising:
    a sensor;
    a calibration section coupled to the sensor, said calibration section comprising a level shifter, a gain stage and a signal level analyzer for processing calibration curves, wherein said calibration section further comprises a reference section providing a common mode reference; and
    a switch to change from the common mode reference to a phase detector output corresponding to the sensor.

24. The system of claim 23, further comprising:
    a controller configured to control a gain of the gain stage depending on the calibration curves.

* * * * *